(12) United States Patent
Campbell, Jr. et al.

(10) Patent No.: US 8,647,022 B2
(45) Date of Patent: Feb. 11, 2014

(54) BROACHING TOOL

(75) Inventors: James D. Campbell, Jr., East Hampton, CT (US); Matthew C. Gartland, Frisco, TX (US); Barclay Bingham Young, Jr., Chester, CT (US); Szymon Kuskowski, Jacksonville, FL (US)

(73) Assignee: United Technologies Corporation, Hartford, CT (US)

( * ) Notice: Subject to any disclaimer, the term of this patent is extended or adjusted under 35 U.S.C. 154(b) by 288 days.

(21) Appl. No.: 13/018,988

(22) Filed: Feb. 1, 2011

(65) Prior Publication Data

US 2012/0195699 A1 Aug. 2, 2012

(51) Int. Cl.
*B23D 43/02* (2006.01)

(52) U.S. Cl.
CPC ..................................... *B23D 43/02* (2013.01)
USPC ................................. 407/15; 407/18; 407/19

(58) Field of Classification Search
USPC ............. 407/15, 17, 18, 19, 13; 409/259, 287
IPC .................................. B23D 43/00,43/02, 43/04
See application file for complete search history.

(56) References Cited

U.S. PATENT DOCUMENTS

| | | | |
|---|---|---|---|
| 545,739 A | 9/1895 | Shaw | |
| 593,028 A | 11/1897 | Olson | |
| 1,440,933 A * | 1/1923 | Perkins et al. | 407/17 |
| 3,566,494 A | 3/1971 | Robinson | |
| 3,641,642 A | 2/1972 | Schmidt | |
| 3,662,443 A | 5/1972 | Schmidt | |
| 3,700,353 A | 10/1972 | Ortolano | |
| 4,243,347 A * | 1/1981 | Clapp et al. | 407/15 |
| 4,274,775 A | 6/1981 | Girardi | |
| 4,564,320 A | 1/1986 | Roseliep | |
| 4,985,609 A | 1/1991 | Hofele | |
| 5,135,339 A | 8/1992 | Kelm et al. | |
| 5,242,251 A | 9/1993 | Armstrong et al. | |
| 5,314,598 A | 5/1994 | Glew et al. | |
| 6,551,032 B1 | 4/2003 | Nolan et al. | |
| 6,676,336 B2 | 1/2004 | Nolan et al. | |
| 2002/0025232 A1 | 2/2002 | Miller | |
| 2005/0175461 A1 | 8/2005 | Lagrange et al. | |

FOREIGN PATENT DOCUMENTS

| | | | |
|---|---|---|---|
| CN | 1290584 A | | 4/2001 |
| GB | 1 560 472 | | 2/1980 |
| JP | 2004291098 A | | 10/2004 |
| JP | 2005081468 A | * | 3/2005 |
| WO | WO 02/098592 A1 | | 12/2002 |
| WO | WO 2007/032728 | | 3/2007 |

OTHER PUBLICATIONS

English machine translation of JP2005081468A.*
Extended European Search Report for International Application Serial No. EP11194171.2; dated May 15, 2012; 11 pages.

* cited by examiner

*Primary Examiner* — Andrea Wellington
*Assistant Examiner* — Alan Snyder
(74) *Attorney, Agent, or Firm* — Kinney & Lange, P.A.

(57) ABSTRACT

A broaching apparatus includes a first tooth having a front face, a rear face opposite the front face, and a first cutting surface have a lobed shape extending along a first side of the first tooth between the front face and the rear face. A first interface defined between the first cutting surface and the front face is offset relative to a second interface defined between the first cutting surface and the rear face in a direction that is substantially perpendicular to an axis of tooth movement for broaching operations to provide tool clearance rearward from the first interface. A method of making a broach cutter is further provided.

12 Claims, 5 Drawing Sheets

BROACHING TOOL

BACKGROUND

The present invention relates to broaching tools and methods of manufacturing the same.

Broaching is a machining technique commonly used to form radial retention slots in disks (e.g., compressor, fan and turbine disks) for aerospace applications, as well as in other applications. Broaching provides for slot formation with relatively high dimensional accuracy desired for aerospace applications, with tolerances in the range of 0.0254 mm (0.001 inch) or less. During the process, a disk workpiece is initially formed using cast and/or other suitable techniques. Broaching tools are then moved in a linear manner and repeatedly brought into contact with the disk workpiece to incrementally remove material from the workpiece to form a slot. In a typically application, a series of discrete and incremental broaching tools are used (e.g., from 10-30 discrete tools), from a "rougher" broach tool used to first define a rough slot opening to a "finisher" broach tool later used to refine a final slot shape to close tolerances.

Conventional prior art broaching tools were each made from a single piece of high speed steel (also called tool steel) with a grinding process. FIG. 1 is a perspective view of a prior art broaching tool 10 formed by grinding. Only a single tooth portion of the tool 10 is shown in FIG. 1, but as discussed above the tool 10 would include multiple teeth (e.g., 12-60 teeth per tool) integrally made from a single piece of high speed steel and arranged in a row for sequential contact with a workpiece. The tool 10 includes a front face 12 and an opposite rear face (not visible in FIG. 1), as well as a cutting surface 14. The cutting surface 14 extends between opposite faces of the tool 10, and adjoins the front face 12 at an interface 16 and adjoins the rear face at an interface 18. In the illustrated embodiment, the cutting surface 14 has a lobed configuration. More particularly, the illustrated cutting surface 14 is configured so as to define half of a fir tree shaped slot in a workpiece (not shown). The cutting surface defines so-called female lobes 14F, which are like relative low points, depressions or troughs, and so-called male lobes 14M, which are like relative high points, hills or peaks. An axis A is defined relative to the tool 10 that defines a direction of travel of the tool 10 relative to a workpiece during broaching operations. The front face 12 is the side of the tool 10 that approaches the workpiece first, meaning that the interface 16 is the portion of the tool 10 that generally contacts the workpiece first on each pass of the broaching tool 10.

Conventional broaching tools made by a grinding process, such as the tool 10, have numerous drawbacks and limitations. In order to fabricate a broaching tool by grinding, tool manufacturers have lead times of many weeks or months. Moreover, damage to any tooth of the tool may require scrapping of the entire tool. Because broaching tools can have a substantial cost (e.g., $40,000-50,000 U.S.), it is desirable to extend the life of the tool as much as possible. Broaching tools usually can be sharpened a limited number of times, usually a maximum of about four times before they must be discarded. It is often possible to broach no more than 4-8 workpieces per tool, which contributes to a relatively high cost of production for broached disks. Furthermore, broach tools made from high speed steel typically operate at up to about 305 cm/min. (10 feet/min). Moreover, high speed steel broaching tools work reasonably well on titanium workpieces, but not as well on workpieces made from nickel alloys (e.g., powdered nickel materials).

A particular problem encountered with prior art broaching tools relates to inadequate tool clearance. Inadequate tool clearance results in undesired rubbing of a broach tool against a workpiece that produces metallurgical phase changes in the workpiece due to pressure exerted by the broaching tool, which debits the life of the workpiece. A particularly undesirable scenario resulting from inadequate tool clearance is the formation of a white etch layer (WEL) in the workpiece from undesired tool rubbing. Inadequate clearance can result from contact between a portion of a tooth of the broaching tool and the workpiece after the tooth has removed desired material from the workpiece but before the tooth has been moved past the slot location in the workpiece.

In order to make prior art broaching tools by grinding, a grinding wheel is formed to a desired shape and then moved back and forth along a single dimension parallel with the axis A shown in FIG. 1. Clearance can be provided in the tool 10 though grinding, but only to a limited extent due to the limited movement capabilities of the grinding wheel. A blank from which the tool 10 is made can be angled by a grinding machine table 20 such that an offset is provided along the cutting surface 14 of the tool 10 between the interfaces 16 and 18 at an angle $\alpha$. That offset provided by the angle $\alpha$ provides tool clearance, so that portions of the tool 10 rearward from the front face 12 and the interface 16 are spaced from the workpiece during broaching operations to reduce a risk of rubbing. However, as shown in FIG. 1, limited single-axis movement of the grinding wheel parallel to the axis A allows tool clearance to be provided in only certain areas of the cutting surface 14 identified by stippling. These stippled areas of the cutting surface 14 tend to be relatively horizontally oriented as shown in FIG. 1, and tend to be at central portions of each of the female and male lobes 14F and 14M. Regions of the cutting surface 14 between the stippled areas, which tend to be relatively vertically oriented as shown in FIG. 1, have little or no clearance, due to the limited single-axis of movement of the grinding wheel. Some cutting surfaces of broaching tools can have nearly "square waveform" shapes, which can make it impossible to provide clearance along the entire cutting surface due to almost purely vertical portions of the associated cutting surface.

It is therefore desired to provide an improved broaching tool.

SUMMARY

A broaching apparatus according to the present invention includes a first tooth having a front face, a rear face opposite the front face, and a first cutting surface have a lobed shape extending along a first side of the first tooth between the front face and the rear face. A first interface defined between the first cutting surface and the front face is offset relative to a second interface defined between the first cutting surface and the rear face in a direction that is substantially perpendicular to an axis of tooth movement for broaching operations to provide tool clearance rearward from the first interface.

In another aspect of the present invention, a method of making a broaching tool includes creating one or more teeth by providing a tooth blank that defines a front face and an opposite rear face, using electrical discharge machining to define a lobed cutting surface in the tooth blank having a first interface where the lobed cutting surface meets the front face and a second interface where the lobed cutting surface meets the rear face, and varying the position of an electrical discharge machining electrode when defining the lobed cutting surface such that a tool clearance offset is formed in the lobed cutting surface rearward of the first interface. The tool clearance offset is substantially continuous along the entire lobed cutting surface.

It should be understood that relative terms like front, rear, horizontal, vertical, etc. as used in the present disclosure are used only by way of example, and should not be construed as limiting the present invention. Those of ordinary skill in the art will recognize that components described herein can be positioned in various ways, and that relative terms used to facilitate discussion of particular embodiments and illustrations can vary for particular applications of the present invention.

DETAILED DESCRIPTION

In general, the present invention provides a broaching tool and an associated method of manufacturing the same that provides for a relatively efficient, low-cost and highly adaptable broaching tool with individual cutting teeth that can be independently replaced and rearranged. Individual cutting teeth can be made from a carbide material or other relatively hard material to improve tool life, while other portions of the broaching tool can be made from other materials to reduce cost. If an individual tooth becomes damaged, it can be replaced without having to discard the entire tool—only the particular damaged tooth. Spacers can also be provided to allow for tooth pitch adjustments (i.e., adjustments of inter-tooth spacing) without requiring manufacture of a new broaching tool. This allows for pitch to be experimentally optimized for particular applications in a way that would have been cost-prohibitive with fixed-pitch broaching tools that would require new tools to be made to test each configuration. Furthermore, broaching tool teeth can provide for substantially continuous clearance along at least a portion of a lobed (e.g., fir tree shaped) cutting surface of a broaching tool tooth, to reduce or eliminate undesired tool-workpiece rubbing during broaching operations. Broaching tool teeth according to the present invention can be made using an electrical discharge machining (EDM) process, such as wire EDM, to provide suitable tool clearance. Other features and benefits of the present invention will be recognized in view of the totality of the present disclosure, including the accompanying figures.

Figure 2:
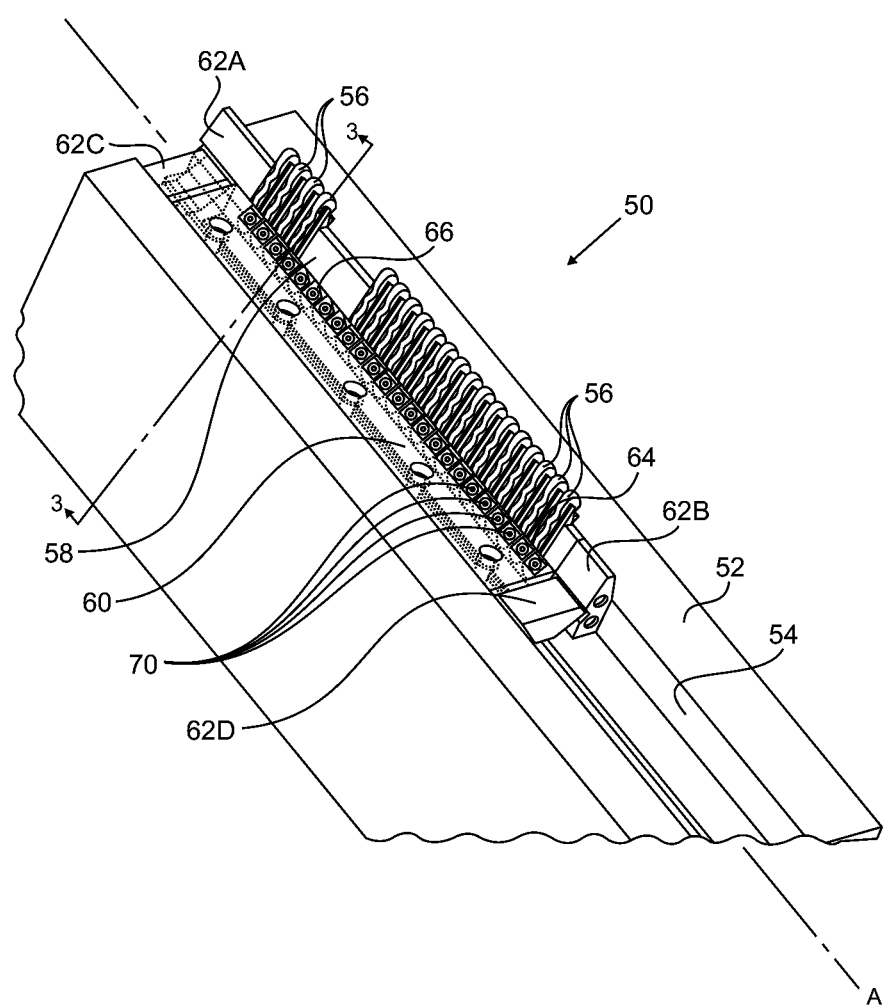
FIG. 2 is a perspective view of a portion of a broaching tool assembly according to the present invention.
Figure 3:
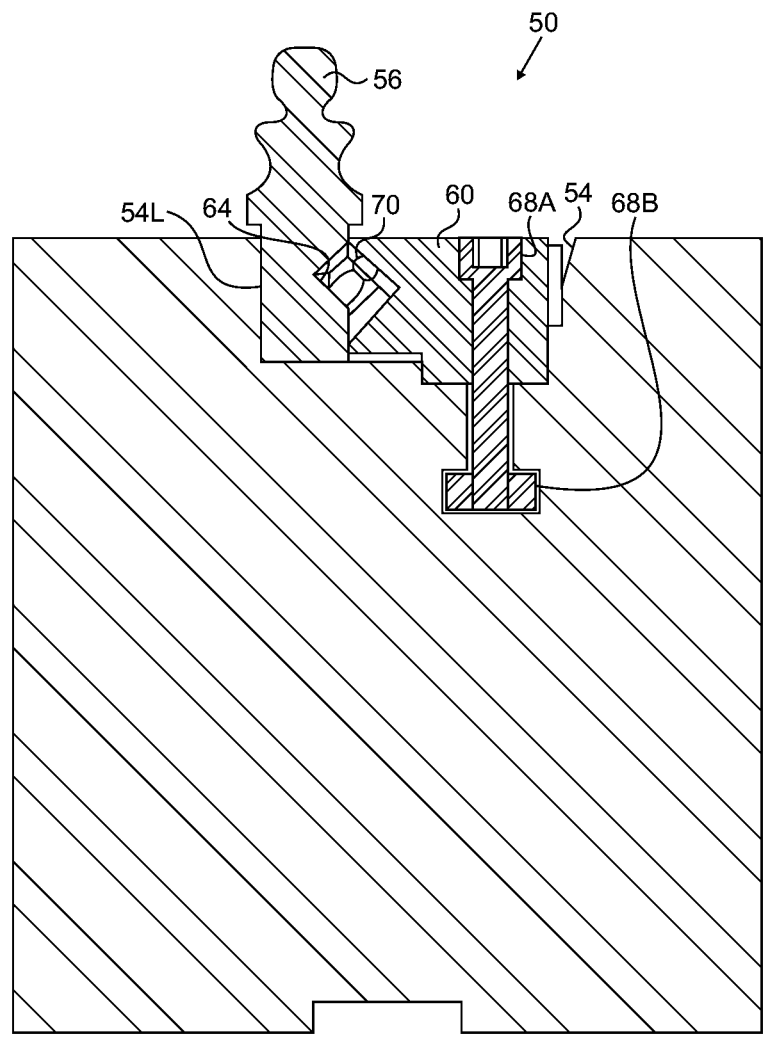
FIG. 3 is a cross-sectional view of the broaching tool assembly, taken along line 3-3 of FIG. 2.

FIG. 2 is a perspective view of a portion of a broaching tool assembly 50 for broaching a slot in a workpiece (not shown) such as a compressor or turbine disk for a gas turbine engine. FIG. 3 is a cross-sectional view of the broaching tool assembly 50, taken along line 3-3 of FIG. 2. In the illustrated embodiment the tool assembly 50 includes a tool body 52 having a tool retention channel 54, a plurality of teeth 56, a spacer 58, a clamp 60, and a number of stoppers 62A-62D the tool assembly is positioned relative to an axis A.

The tool body 52 provides a primary support structure for the tool assembly 50, and can be attached to broaching equipment (not shown) that moves the tool assembly 50 relative to a workpiece during broaching. In the illustrated embodiment the body 52 is shaped generally like an elongate rectangular box (i.e., rectangular prism or cuboid), but can have other configurations as desired in further embodiments. The tool retention channel 54 is defined in one face of the body 52, and can extend between opposite ends of the body 52. At least portions of the teeth 56, the spacer 58, the clamp 60, and/or the stops 62A-62D can be positioned in the retention channel 54. As shown in FIG. 3, the retention channel 54 includes a substantially planar locating surface 54L that allows for alignment of the teeth 56. The particular configuration of the retention channel 54 can vary as desired for particular applications.

The teeth 56 are arranged in a single row along the axis A, and each tooth 56 can extend into the tool retention channel 54 of the tool body 52. In the illustrated embodiment, a first group of sixteen teeth 56 are positioned adjacent to and in contact with one another in a row and a second group of four teeth 56 are positioned adjacent to and in contact with one another in a row, with the first and second groups of teeth 56 separated by the spacer 58. The teeth 56 can each have the same size and shape, or can vary. For example, in a typical embodiment, the teeth 56 can be of increasing sizes from front (shown in the lower right of FIG. 2) to rear (shown in the upper left in FIG. 2) along the axis A, so that each tooth removes some material from a workpiece with each pass of the tool 50 during a broaching operation. The teeth 56 can each be made of a carbide material, or other relatively hard material as desired for particular applications. Use of carbide materials for the teeth 56 allows for broaching operations at a rate of up to approximately 30.48 m/min. (100 ft./min).

Each tooth 56 includes an attachment notch 64. The attachment notch 64 can have a V-shape, and can be spaced from cutting surfaces of the tooth 56 (as explained below with respect to FIGS. 4 and 5). In the illustrated embodiment, the attachment notch 64 faces a lateral direction, and as shown in FIG. 3 faces away from the locating surface 54L of the attachment channel 54.

The spacer 58 is a non-cutting component that is designed to avoid contact with a workpiece during broaching operations. As shown in the illustrated embodiment, the spacer 58 includes a spacer attachment notch 66. The spacer attachment notch 66 can have a configuration substantially identical to that of the attachment notches 64 of the teeth 56 (e.g., a substantially V shape). When positioned adjacent to one or more teeth 56, the spacer attachment notch 66 can align with the attachment notches 64 of the adjacent teeth 56. Within the tool assembly 50, the spacer 58 can be positioned between any two of the teeth 56 to adjust a pitch of the teeth 56. Pitch refers to the axial spacing between successive teeth along the axis A of the tool assembly 50. Although a single spacer 58 is shown in the embodiment of FIG. 2, any number of spacers can be provided in alternative embodiments, or the spacer can be omitted entirely. Moreover, the particular location of the spacer 58 (or spacers) along the tool 50 can vary as desired for particular applications. As shown in the embodiment of FIG. 2, the spacer has an axial dimension that is on the order of the thickness of four or more teeth 56, and creates a "gap" during a given broaching pass of the tool 50 to allow a workpiece to "relax" between a period of contact with the first group of teeth 56 and a period of contact with the second, rearward group of teeth 56. Pitch can be particularly important in tailoring the configuration of the tool 50 with respect to a thickness of a workpiece desired to be broached.

The clamp 60 can be an elongate member that allows for commonly securing the plurality of teeth 56 and the spacer 58 to the tool body 52 to retain those components in directions substantially perpendicular to the axis A. The clamp 60 can contact and engage the teeth 56 and the spacer 58 at the respective attachment notches 64 and 66. In that way, as shown most clearly in FIG. 3, the clamp 60 can restrain movement of the teeth 56 (and the spacer 58) against the tool body 52 and within the attachment channel 54. The clamp can help prevent undesired movement of discrete components during broaching operations that can produce cutting forces up to about 44.5 kilonewtons (10,000 lbs.). Suitable fasteners, such as bolts 68A and nuts 68B, can be used to secure the clamp 60 to the tool body 52. In the illustrated embodiment, the clamp 60 is positioned within the tool retention channel 54. Set screws 70 are threadably and adjustably engaged with the clamp 60, and can each be adjusted to as to contact a corresponding one of the teeth 56, the spacer 58 or other component. Specifically, the set screws 70 can be adjusted into contact with a surface of the attachment notch 64 or 66 of the teeth 56 or spacer 58. Because the spacer 58 can have a relatively large axial dimension in some embodiments, multiple set screws 70 may contact the spacer 58. Adjustment of the set screws 70 allows a tight engagement of the teeth 56 and the spacer 58 within the retention channel 54 of the tool body 60. Use of the clamp 60 and the set screws 70 provides an alternative retention mechanism to an axially extending tie rod or bolt passing through the teeth 56.

The stoppers 62A-62D help to axially restrain components of the tool assembly 50 relative to the tool body 52 along the axis A. Each of the stoppers 62A-62D can be at least partially positioned within the tool retaining channel 54. The stoppers 62A and 62B can be positioned to axial restrain the teeth 56 and the spacer 58 while the stoppers 62C and 62D can axially restrain the clamp 60. The stoppers 62C and 62D can further help retain the stoppers 62A and 62B, respectively, relative to the tool body 52 in directions substantially perpendicular to the axis A.

Figure 4:
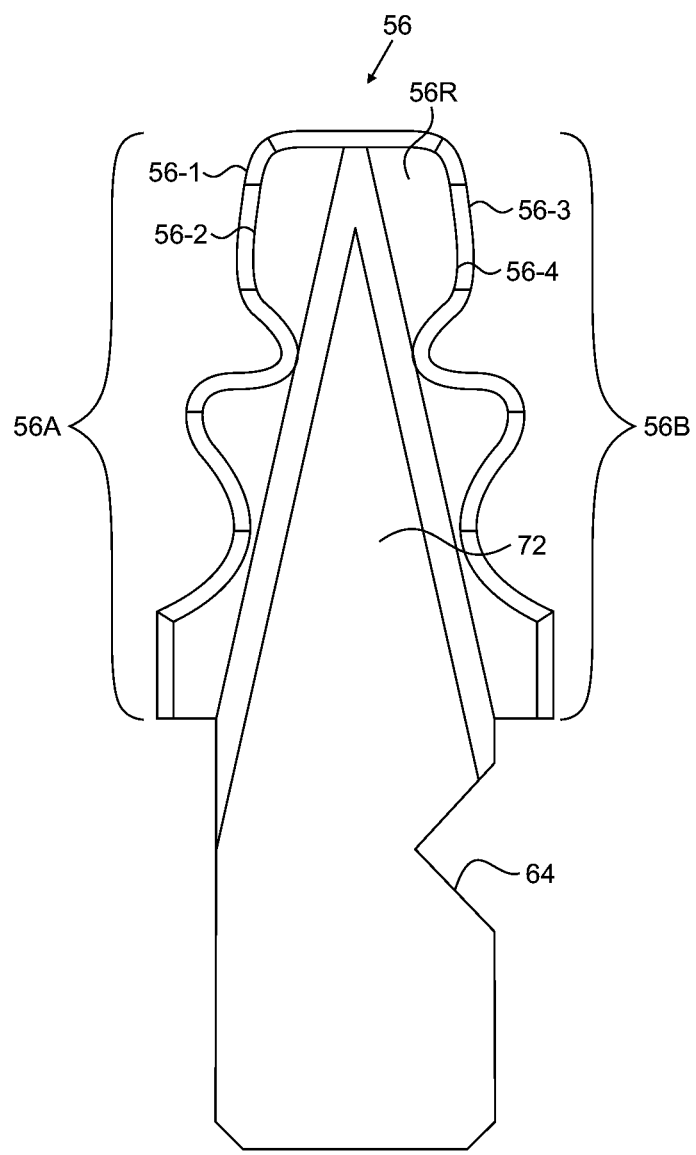
FIG. 4 is an elevation view of an individual tooth of the broaching tool assembly of FIGS. 2 and 3, shown from a front side of the tooth.
Figure 5:
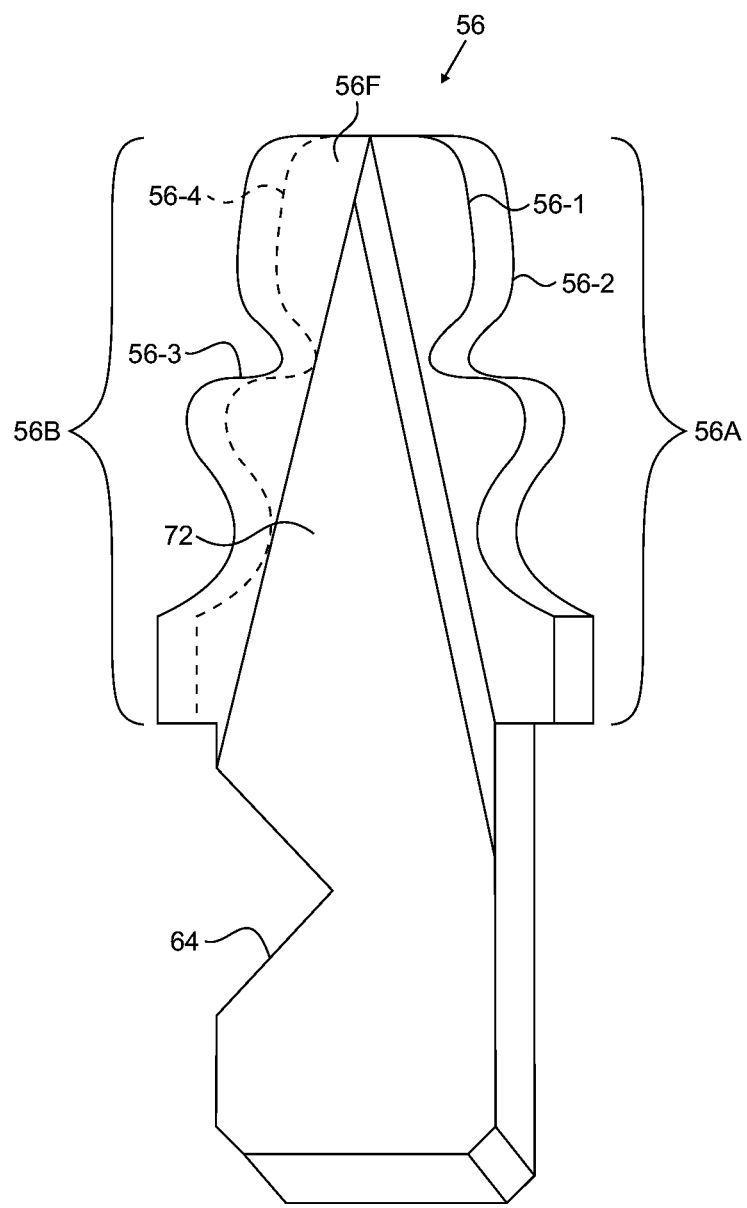
FIG. 5 is a perspective view of the individual tooth of FIG. 4, shown from a rear side of the tooth.

FIG. 4 is an elevation view of an individual one of the teeth 56 of the broaching tool assembly 50, shown from a front side of the tooth 56, and FIG. 5 is a perspective view of the individual tooth 56, shown from a rear side of the tooth 56. The tooth shown in FIGS. 4 and 5 is generally representative of all of the teeth 56 shown in FIGS. 2 and 3, though as noted above each of the teeth can have slightly different sizes while having the same general shape and configuration.

The tooth 56 has a cutting surface 56A and a cutting surface 56B, as well as a front face 56F and a rear face 56R. The front face 56F is generally configured to approach a workpiece first during broaching operations, with the rear face 56R following the front face 56F. The front and rear faces 56F and 56R oppose one other, and the cutting surfaces 56A and 56B generally oppose each other but can meet at an apex of the tooth 56. The cutting surfaces 56A and 56B are both spaced from the attachment notch 64. In the illustrated embodiment the tooth 56 has a symmetrical lobed shape, which can be a fir tree shape. An interface 56-1 is defined where the cutting surface 56A and the front face 56F meet, and an interface 56-2 is defined where the cutting surface 56A and the rear face 56R meet. An interface 56-3 is defined where the cutting surface 56B and the front face 56F meet, and an interface 56-4 is defined where the cutting surface 56B and the rear face 56R meet. A rib 72 can be provided along the front face 56F and/or the rear face 56R of the tooth 56, to help define a pitch between adjacent teeth 56 in the tool assembly 50. The rib 72, which is generally triangular in shape in the illustrated embodiment, has an outer perimeter that is smaller than the cutting surfaces 56A and 56B, to help prevent the rib 72 from contacting a workpiece during broaching.

Figure 1:
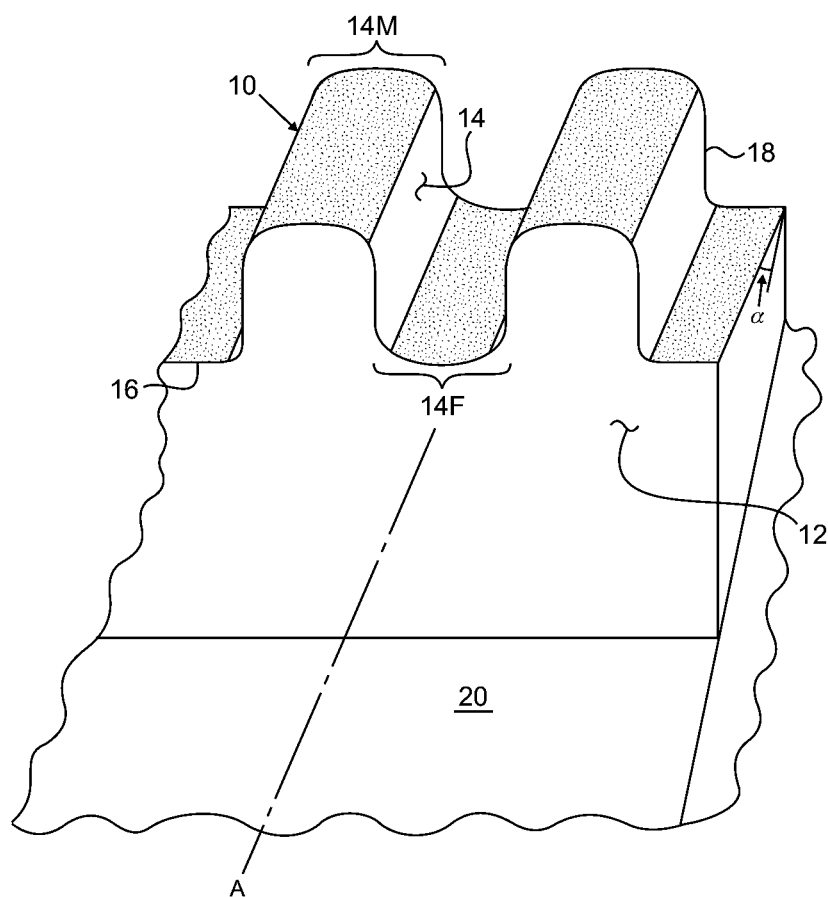
FIG. 1 is a perspective view of a prior art broaching tool formed by grinding.

The tooth 56 can have tool clearance provided along the cutting surfaces 56A and 56B, such that rearward portions of the cutting surfaces 56A and 56B protrude less than forward portions, to help reduce undesired tool rubbing on workpieces during broaching operations. In the illustrated embodiment, the interface 56-1 (defined between the cutting surface 56A and the front face 56F) is offset relative to the interface 56-2 (defined between the cutting surface 56A and the rear face 56R) in a direction that is substantially perpendicular to the axis A to provide tool clearance rearward from the interface 56-1. The interface 56-3 (defined between the cutting surface 56B and the front face 56F) is also offset relative to the interface 56-4 (defined between the cutting surface 56B and the rear face 56R) in a direction that is substantially perpendicular to the axis A to provide tool clearance rearward from the interface 56-3. The amount of clearance provided can vary as desired for particular applications. In one embodiment, the clearance is provide such that the cutting surfaces 56A and 56B are arranged at an angle $\alpha$ of approximately 3° (see FIG. 1). The clearance for both cutting surfaces 56A and 56B can be continuous along the lobed cutting surfaces 56A and 56B, in contrast to the intermittent and discontinuous clearance of prior art broaching tools as shown in FIG. 1.

In order to manufacture the tool assembly 50, one or more teeth of the teeth 56 are created by providing a tooth blank (e.g., a block of carbide material) that defines a front face and an opposite rear face, using an EDM process to define at least one lobed cutting surface (56A or 56B) in the tooth blank, and varying the position of an EDM electrode when defining the lobed cutting surface such that a tool clearance offset is formed in the lobed cutting surface. A suitable EDM process is a wire EDM process. After the teeth 56 are created, a plurality of the teeth 56 are secured together at the tool retention channel 54 in the tool body 52. One or more spacers 58 can be inserted between two of the teeth 56 to adjust a pitch between sequential cutting surfaces of the broaching tool assembly 50. The clamp 60 can be attached to the tool body 52 to commonly secure the teeth 56 and the spacer 58 to the tool body 52. The set screws 70 can be threadably engaged with the clamp 60, and one or more of the set screws 70 can be adjusted to contact corresponding teeth 56. Broaching can then be performed with the tool assembly 50 by moving the tool assembly 50 along the axis A and into contact with a workpiece.

The present invention allows for pitch adjustment for the tool assembly 50. In this way, optimal pitch parameters can be experimentally determined, or simply adjusted as desired. Pitch readjustment can be accomplished by removing the spacer 58 from the tool body 52, and inserting another spacer 58 of a different dimension (i.e., a different axial dimension) between two of the teeth 56 to readjust a pitch between sequential cutting surfaces of the broaching tool assembly 50.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims. For example, cutting surfaces of a broaching tool according to the present invention can have nearly any shape desired for particular applications.

The invention claimed is:

1. A broaching apparatus comprising:
    a first tooth comprising:
        a front face;
        a rear face opposite the front face;
        a first cutting surface with a lobed shape extending along a first side of the first tooth between the front face and the rear face such that a first interface defined between the first cutting surface and the front face is offset relative to a second interface defined between the first cutting surface and the rear face in a direction that is substantially perpendicular to an axis of tooth movement for broaching operations to provide tool clearance rearward from the first interface;
    a tool body having a tool retention channel;
    a first attachment notch located in the first tooth at a location spaced from the first cutting surface;
    a clamp at least partially inserted into the first attachment notch of the first tooth to retain the first tooth at least partially within the tool retention channel of the tool body, wherein the clamp is secured to the tool body with at least one fastener; and
    a set screw threadably engaged with the clamp and adjustably engageable with the first attachment notch in the first tooth.

2. The apparatus of claim 1, where the tool clearance offset between the first interface and the second interface is configured to be at an angle of approximately 3°.

3. The apparatus of claim 1, wherein the first tooth comprises a carbide material.

4. The apparatus of claim 1, the first tooth further comprising:
    a second cutting surface with a lobed shape extending along a second side of the first tooth located opposite the first side, between the front face and the rear face, such that a third interface defined between the second cutting surface and the front face is offset relative to a fourth interface defined between the second cutting surface and the rear face in a direction that is substantially perpendicular to an axis of tooth movement for broaching operations to provide tool clearance rearward from the third interface.

5. The apparatus of claim 1 and further comprising:
    a second tooth with a lobed shape positioned adjacent to the first tooth, the second tooth configured to be larger than the first tooth and including a second attachment notch, wherein the clamp is at least partially inserted into the second attachment notch of the second tooth to commonly retain the second tooth with the first tooth at least partially within the tool retention channel of the tool body.

6. The apparatus of claim 5 and further comprising:
    a third tooth retained with the tool retention channel of the tool body by the clamp; and
    a spacer positioned between the third tooth and the second tooth defining an outer perimeter surface that is smaller than any teeth retained in the tool retention channel such that the spacer will not contact a workpiece during a broaching operation, the spacer including a spacer attachment notch, wherein the clamp is at least partially inserted into the spacer attachment notch of the spacer to retain the spacer at least partially within the tool retention channel of the tool body.

7. The apparatus of claim 1 wherein the lobed shape of the first cutting surface comprises at least a portion of a fir tree shape.

8. A broaching assembly comprising:
    a tool body having a tool retention channel;
    a first tooth comprising:
        a front face;
        a rear face opposite the front face;
        a first cutting surface having a fir tree shape extending along a first side of the first tooth between the front face and the rear face of the first tooth, such that a first interface defined between the first cutting surface and the front face is offset relative to a second interface defined between the first cutting surface and the rear face in a direction that is substantially perpendicular to an axis of tooth movement for broaching operations to provide tool clearance rearward from the first interface;
        a second cutting surface having a fir tree shape extending along a second side of the first tooth located opposite the first side; and
        a first attachment notch at a location spaced from the first and second cutting surfaces;
    a second tooth positioned adjacent to the first tooth, the second tooth comprising:
        a front face;
        a rear face opposite the front face;
        a third cutting surface having a fir tree shape extending along a first side of the second tooth between the front face and the rear face of the second tooth such that a third interface defined between the third cutting surface and the front face is offset relative to a fourth interface defined between the third cutting surface and the rear face in a direction that is substantially perpendicular to an axis of tooth movement for broaching operations to provide tool clearance rearward from the third interface; and
        a second attachment notch at a location spaced from the third cutting surface;
    a spacer positioned between the first tooth and the second tooth and defining an outer perimeter surface that is smaller than any teeth retained in the tool retention channel such that the spacer will not contact a workpiece during a broaching operation, wherein the spacer includes a spacer attachment notch;
    a clamp at least partially inserted into each of the first and second attachment notches and the spacer attachment notch to commonly retain the first tooth, the second tooth and the spacer at least partially within the tool retention channel of the tool body, wherein the clamp is secured to the tool body with at least one fastener; and
    a first set screw threadably engaged with the clamp and adjustably engageable with the first attachment notch in the first tooth; and
    a second set screw threadably engaged with the clamp and adjustably engageable with the second attachment notch in the second tooth.

9. The assembly of claim 8, where the tool clearance offset between the first interface and the second interface is configured to be at an angle of approximately 3°.

10. The assembly of claim 8, wherein the first tooth comprises a carbide material.

11. The assembly of claim 8, wherein the second tooth is configured to be larger than the first tooth.

12. The assembly of claim 8 and further comprising:
    an additional tooth retained with the tool retention channel of the tool body by the clamp, wherein the additional tooth is positioned adjacent to the first tooth.

* * * * *